United States Patent
Reinke

(10) Patent No.: US 11,703,521 B2
(45) Date of Patent: Jul. 18, 2023

(54) MEMS VIBRATING BEAM ACCELEROMETER WITH BUILT-IN TEST ACTUATORS

(71) Applicant: Honeywell International Inc., Charlotte, NC (US)

(72) Inventor: John Reinke, Plymouth, MN (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 17/112,717

(22) Filed: Dec. 4, 2020

(65) Prior Publication Data
US 2022/0178963 A1  Jun. 9, 2022

(51) Int. Cl.
G01P 15/08 (2006.01)
G01P 21/00 (2006.01)
G01P 15/097 (2006.01)
G01P 15/13 (2006.01)

(52) U.S. Cl.
CPC ........ *G01P 15/0802* (2013.01); *G01P 15/097* (2013.01); *G01P 15/131* (2013.01); *G01P 21/00* (2013.01); *G01P 2015/0868* (2013.01)

(58) Field of Classification Search
CPC .... G01P 15/0802; G01P 15/18; G01P 15/097; G01P 15/08; G01P 15/131
See application file for complete search history.

(56) References Cited

U.S. PATENT DOCUMENTS

| | | | |
|---|---|---|---|
| 5,501,103 A * | 3/1996 | Woodruff | G01P 15/097 73/514.29 |
| 5,969,249 A * | 10/1999 | Roessig | G01P 15/0802 73/514.15 |
| 8,372,677 B2 | 2/2013 | Mehregany | |
| 8,875,578 B2 | 11/2014 | Smith | |
| 9,297,826 B2 | 3/2016 | Fang et al. | |
| 9,442,131 B2 | 9/2016 | Hazel et al. | |
| 9,689,888 B2 | 6/2017 | Becka | |
| 9,733,268 B2 | 8/2017 | Membretti et al. | |
| 10,050,155 B2 | 8/2018 | Acar | |
| 10,236,858 B1 | 3/2019 | Sorenson et al. | |
| 10,352,960 B1 * | 7/2019 | Shcheglov | G01P 15/097 |
| 10,379,137 B2 | 8/2019 | Gafforelli et al. | |
| 10,393,618 B2 | 8/2019 | Jones et al. | |
| 10,564,179 B2 | 2/2020 | Gafforelli et al. | |
| 10,571,485 B2 | 2/2020 | Durston et al. | |
| 10,859,596 B2 | 12/2020 | Reinke | |

(Continued)

FOREIGN PATENT DOCUMENTS

| CN | 110221098 A | 9/2019 |
|---|---|---|
| EP | 3121605 B1 | 5/2018 |

OTHER PUBLICATIONS

Grinberg, "Closed-loop MEMS Accelerometer: from design to production", Inertial Sensors and Systems 2016 P13, Karlsruhe, Sep. 2016, 16 pp.

(Continued)

*Primary Examiner* — Helen C Kwok

(74) *Attorney, Agent, or Firm* — Shumaker & Sieffert, P.A.

(57) ABSTRACT

An example system comprising: a microelectromechanical system (MEMS) vibrating beam accelerometer (VBA) comprising: a proof mass; and a first resonator mechanically coupled to the proof mass; a first electrode configured to apply a force to the proof mass.

18 Claims, 4 Drawing Sheets

(56) References Cited

U.S. PATENT DOCUMENTS

| | | | |
|---|---|---|---|
| 10,866,258 B2 | 12/2020 | Reinke | |
| 2001/0020726 A1* | 9/2001 | Peterson | G01P 15/125 |
| | | | 257/415 |
| 2002/0157467 A1* | 10/2002 | Collins | G01P 15/0802 |
| | | | 73/504.16 |
| 2005/0160816 A1* | 7/2005 | Yu | B81C 3/002 |
| | | | 73/514.29 |
| 2012/0067124 A1* | 3/2012 | Zolfagharkhani | G01P 15/097 |
| | | | 73/579 |
| 2014/0165724 A1* | 6/2014 | Krylov | G01P 15/125 |
| | | | 73/514.15 |
| 2014/0306623 A1 | 10/2014 | Caffee et al. | |
| 2015/0226762 A1* | 8/2015 | Seshia | G01P 15/097 |
| | | | 73/495 |
| 2016/0097789 A1* | 4/2016 | Clark | G01P 15/02 |
| | | | 73/514.01 |
| 2016/0139170 A1* | 5/2016 | Dwyer | G01P 15/03 |
| | | | 73/514.29 |
| 2016/0139171 A1* | 5/2016 | Becka | G01P 15/032 |
| | | | 73/514.29 |
| 2016/0349283 A1* | 12/2016 | Bramhavar | G01P 15/093 |
| 2017/0168086 A1* | 6/2017 | Gafforelli | G01P 21/00 |
| 2017/0205440 A1 | 7/2017 | Zhang et al. | |
| 2018/0321275 A1 | 11/2018 | Liukku et al. | |
| 2019/0277877 A1 | 9/2019 | Smith et al. | |
| 2019/0293421 A1* | 9/2019 | Wei | G01P 15/125 |
| 2020/0011702 A1 | 1/2020 | Clark | |
| 2020/0064367 A1 | 2/2020 | Strehlow et al. | |
| 2020/0096536 A1* | 3/2020 | Zou | G01P 15/0802 |
| 2020/0166537 A1* | 5/2020 | Zou | G01P 15/0802 |
| 2021/0140992 A1 | 5/2021 | Reinke | |
| 2021/0140993 A1 | 5/2021 | Reinke | |
| 2021/0140995 A1 | 5/2021 | Reinke | |

OTHER PUBLICATIONS

Mukherjee et al., "Effect of Voltage Induced Electrostatic Forces on MEMS Capacitive Accelerometer," IEEE Students' Technology Symposium, Jan. 14-16, 2011, 6 pp.

Thales, "Inside Unmanned Systems," webinar presented Jul. 8, 2020, 31 pp.

Lefort et al., "To the production of a robust and highly accurate MEMS vibrating accelerometer," Inertial Sensors and Systems, Sep. 2017, 19 pp.

Ullah et al., "A New High Performance Sigma-Delta MEMS Accelerometer for Inertial Navigation," Inertial Sensors and Systems 2015, downloaded on Aug. 13, 2021, 13 pp.

"IEEE Standard Specification Format Guide and Test Procedure for Linear Single-Axis, Nongyroscopic Accelerometers," IEEE Aerospace and Electronic Systems Society, approved Oct. 23, 2018, 271 pp.

Leclerc, "MEMs for Aerospace Navigation," Thales Avionics, May 2007, 6 pp.

Lefort et al., "Inertial Grade Silicon Vibrating Beam Accelerometer," Inertial Sensors and Systems, 2012, 19 pp. (Applicant points out, in accordance with MPEP 609.04(a), that the year of publication, 2019, is sufficiently earlier than he effective U.S. filing date, so that the particular month of publication is not in issue.).

Extended Search Report from counterpart European Application No. 21210322.0 dated Jun. 8, 2022, 9 pp.

Response to Extended Search Report dated Jun. 8, 2022, from counterpart European Application No. 21210322.0 filed Jul. 26, 2022, 33 pp.

* cited by examiner

MEMS VIBRATING BEAM ACCELEROMETER WITH BUILT-IN TEST ACTUATORS

TECHNICAL FIELD

The present disclosure relates to vibrating beam accelerometers.

BACKGROUND

Accelerometers function by detecting a displacement of a proof mass under inertial forces. In one example, an accelerometer may detect the displacement of a proof mass by the change in frequency of a resonator connected between the proof mass and a support base. A resonator, which may be designed to change frequency proportional to the load applied to the resonator by the proof mass under acceleration. The resonator may be electrically coupled to an oscillator, or other signal generation circuit, which causes the resonator to vibrate at its resonant frequency.

SUMMARY

Systems and techniques for measurement of proof mass motion at wafer-level probe testing prior to packaging are described. In some examples, a built-in test actuator of a microelectromechanical system (MEMS) vibrating beam accelerometer (VBA) is disclosed.

In one example, this disclosure describes a system comprising: a microelectromechanical system (MEMS) vibrating beam accelerometer (VBA) comprising: a proof mass; and a first resonator mechanically coupled to the proof mass; a first electrode configured to apply a force to the proof mass.

In another example, this disclosure describes a method of testing of a microelectromechanical system (MEMS) vibrating beam accelerometer (VBA) includes applying a force to a proof mass of a MEMS VBA via a first electrode; and detecting, by either of a second electrode and a first resonator, a motion of the proof mass due to the applied force, wherein the first resonator is mechanically coupled to the proof mass.

In another example, this disclosure describes a system comprising: a microelectromechanical system (MEMS) vibrating beam accelerometer (VBA) comprising: a proof mass; a first resonator mechanically coupled to the proof mass; a second resonator mechanically coupled to the proof mass, wherein the first resonator and the second resonator are arranged with opposing scale factors; a first electrode configured to apply a force to the proof mass; a second electrode configured to sense a motion of the proof mass and output a signal corresponding to the sensed motion of the proof mass; and processing circuitry configured to: cause the first electrode to apply the force to the proof mass; receive a signal corresponding to the motion of the proof mass in response to the applied force sensed by the second electrode; and determine the motion of the proof mass based on the received signal.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

The disclosure is directed to a MEMS VBA including one or more built-in test actuators. VBAs function by using a proof mass to apply inertial force to one or more vibrating beams, or resonators, such that the applied acceleration can be measured as a change in resonant frequency of the vibrating beam(s). Control electronics interface with resonator drive and sense electrodes to sustain motion of the vibrating beam(s). Typically, two vibrating beams are arranged with opposing scale factors, in hertz/g (Hz/g, where g represents acceleration due to gravity near the surface of the earth), so that the differential frequency ($f_2-f_1$) represents measured acceleration. This differential frequency output helps reject common-mode error sources, as described further below.

In some examples, including one or more built-in test actuators enables measurement of proof mass motion at wafer-level probe testing so that failing devices can be screened out earlier in the manufacturing process, e.g., prior to packaging. Typically, wafer-level probe testing only verifies that the two resonators are functioning normally. Usually, one cannot shake or tilt the wafer-level probe tester to induce motion of the proof mass. Failures associated with proof mass motion, such as broken flexures or stuck devices, can then only be detected by visual inspection or after packaging when the device can be tumbled, for example, between +/−1 g, where g denotes an acceleration equal to an acceleration caused by gravity at or near the surface of Earth.

In some examples, measurement of proof mass motion via one or more built-in test actuators may enable a better characterization of the quality factor (Q) associated with the proof mass natural frequency. For example, Q is difficult to measure accurately on a shaker since fixturing needed for typical test setups often adds unexpected mechanical resonances (with frequencies on the order of kHz), whereas such mechanical resonances are not present when measuring Q via built-in test actuators.

Figure 1:
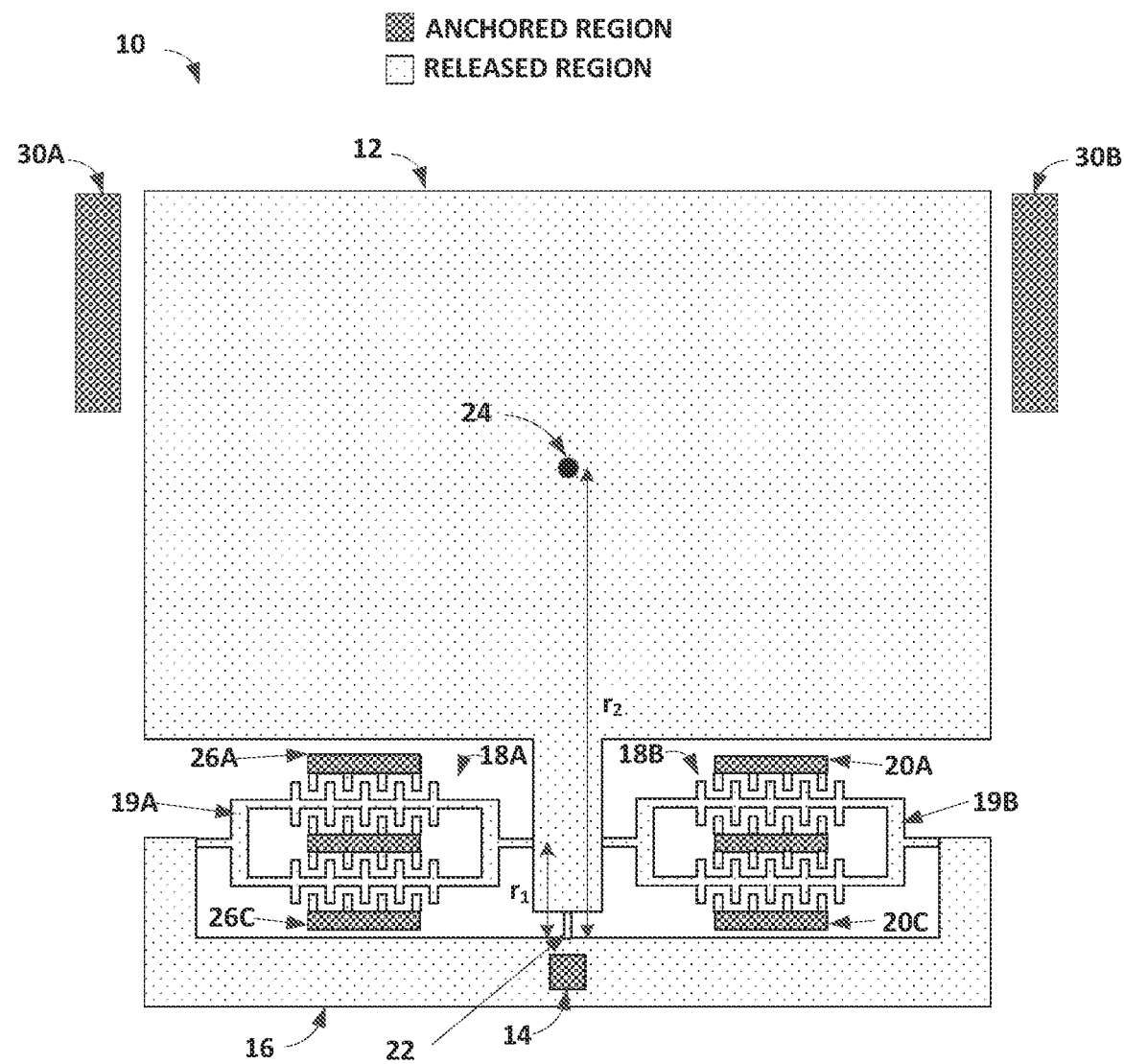
FIG. 1 is a conceptual diagram illustrating a MEMS VBA with X-direction resonators and proof mass actuator electrodes, in accordance with one or more techniques of this disclosure.
Figure 1:
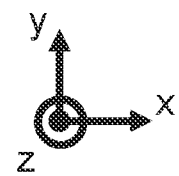

FIG. 1 is a conceptual diagram illustrating a MEMS VBA with X-direction resonators and proof mass actuator electrodes. FIG. 1 is a top view of MEMS VBA 10 showing the anchor 14 to the support base, but the support base is not shown.

MEMS VBA 10 includes pendulous proof mass 12 connected to a rigid resonator connection structure 16 at hinge flexure 22, and resonators 18A and 18B. For a pendulous MEMS VBA according to this disclosure, proof mass 12 may move in a plane parallel to the plane of the support base (not shown in FIG. 1). A support base may be a substrate of, for example, a glass or silicon wafer. Resonators 18A and 18B of MEMS VBA 10 convert the inertial force of proof mass 12 under acceleration, to a change in the driven resonant frequency. The MEMS VBA outputs a change in the resonant frequency of each resonator as an indication of the amount of acceleration. In some examples, the resonators may be located adjacent to the proof mass so that the resonators receive the proof mass force amplified through lever action. Although the example shown in FIG. 1 includes two resonators, in some examples MEMS VBA 10 may include fewer or more resonators, e.g., one resonator or three or more resonators.

MEMS VBA 10 may be fabricated from a dissolved wafer process that produces MEMS VBA 10 as a silicon mechanical structure tethered to lower and upper glass substrates (not shown in FIG. 1) at specific anchor regions, e.g. anchor 14. The glass substrates may be etched in other areas to define released regions of MEMS VBA 10, which include air gaps that allow the silicon portions, such as proof mass 12, to move freely relative to the substrate. Areas which are not etched are bonded to silicon to define mechanical anchors. The geometry of both the silicon mechanism and anchor regions may be defined by photolithography.

A dissolved wafer process to fabricate a silicon MEMS VBA and glass substrates is just one example of a technique to fabricate a MEMS VBA of this disclosure. Other techniques may be used to fabricate the geometry of MEMS VBA 10. Some other examples may include materials such as quartz (SiO2), piezoelectric material and similar materials. Other processes may include isotropic etching, chemical etching, deep reactive-ion etching (DRIE) and similar processes. In the example of FIG. 1, proof mass 12, resonator connection structure 16, hinge flexure 22, resonators 18A, 18B may be comprised of a monolithic material, which results in the components of MEMS VBA 10 all with the same coefficient of thermal expansion (CTE). The components of MEMS VBA 10 are all in the same plane, parallel to the X-Y plane as shown in FIG. 1.

Proof mass 12 connects to resonator connection structure 16 at anchor 14 by hinge flexure 22. The point at which hinge flexure 22 connects to anchor 14 is the center of rotation for proof mass 12. Left and right resonators 18A and 18B connect to the same primary anchor 14 by rigid resonator connection structure 16. Resonators 18A and 18B connect to proof mass 12 at a distance $r_1$ from the center of rotation for proof mass 12. Center of mass 24 for proof mass 12 is at a distance $r_2$ from the center of rotation for proof mass 12. This results in the inertial force of proof mass 12 amplified by the leverage ratio $r_2/r_1$.

In other words, hinge flexure 22 may be configured to flexibly connect proof mass 12 to the resonator connection structure 16. Hinge flexure 22 suspends proof mass 12 parallel to the support base (not shown in FIG. 1) at anchor 14. In response to an acceleration of MEMS VBA 10, proof mass 12 rotates about the hinge flexure 22 in its plane, parallel to the X-Y plane and parallel to the plane of the support base (not shown in FIG. 1). The support base of this disclosure may be formed from the substrate using the etching processes described above.

Resonators 18A and 18B, in the example of FIG. 1, include anchored combs and resonator beams with released combs. Resonator 18A includes resonator beam 19A with released combs and anchored combs 26A-26C and resonator 18B includes resonator beam 19B with released combs and anchored combs 20A-20C. In some examples, anchored combs may be referred to as stator combs. Resonators 18A and 18B are configured to flexibly connect the pendulous proof mass 12 to resonator connection structure 16 with resonator beams 19A and 19B and to flex within the plane of proof mass 12 based on the rotation of the proof mass 12 about hinge flexure 22.

Each of the two resonators 18A and 18B resonate at a respective resonant frequency, which, in some examples may be approximately the same frequency. MEMS VBA 10 includes metal layers deposited onto the glass substrates (not shown in FIG. 1). These metal layers define electrical wires that connect silicon electrodes to bond pads. The bond pads may be external to MEMS VBA 10 and used to electrically connect to external circuitry that excites and sustains mechanical motion at the resonant frequency for each resonator 18A and 18B through electrostatic actuation, e.g. by applying an electric charge. In the presence of external acceleration, proof mass 12 will deflect and apply axial force to resonator beams 19A and 19B of resonators 18A and 18B. This axial force from proof mass 12 causes a change in the driven resonant frequency such that the frequency change may be used to measure external acceleration on MEMS VBA 10.

The tines of the released combs on resonator beams 19A-19B and anchored combs 20A-20C and 26A-26C may enable detection of the change in resonant frequency, which may be translated as an amount of force (e.g., increase or decrease of force) and further translated as the amount of acceleration on MEMS VBA 10. For example, during calibration, the change in frequency may be mapped to a force on the resonator beam, which may be further mapped to an amount of acceleration on MEMS VBA 10. In the example of FIG. 1, the two resonators 18A and 18B allow for a differential frequency measurement results from change in frequency when a force (e.g., compression or tension) is placed on the two resonator beams 19A-19B by rotation of proof mass 12.

The differential frequency measurement output by the sense signals from MEMS VBA 10 is used to reject sources of error common to both resonators. One example may include a temperature change. That is, a change in operating condition, such as a temperature change may affect both resonators the same way. A second example would be any shift in voltages applied to both resonators. A differential frequency measurement may subtract sources of common error applied to both resonators by subtracting the common error and leaving approximately just the signal caused by acceleration on MEMS VBA 10. The differential frequency measurement may then ultimately lead to improved bias repeatability for the accelerometer.

In some examples, the resonators may have a different resonant frequency, for example, resonator 18A may be configured to resonate at a different frequency than resonator 18B. In some examples, the mass of one resonator may be configured to be different from one or more other resonators. A MEMS VBA with resonators that have a different resonant frequency may provide a benefit, for example, when the MEMS VBA is at zero g, (e.g., substantially no acceleration experienced by the MEMS VBA) the resonators may not vibrate at exactly the same frequency. The different frequency at zero g causes an intentional offset in the MEMS VBA and may result in improved detectability and performance.

In the example of FIG. 1, two resonators are used to provide a differential frequency measurement. In other examples, the techniques of this disclosure may also apply to MEMS VBA's with more or fewer resonators. In other examples, the one or more resonators may be oriented at any angle, not just x and y while still using the techniques of this disclosure. Though shown as double-ended tuning fork (DETF) comb resonators in the example of FIG. 1, in other examples, resonators 18A and 18B may be configured as other types of resonators. For example, instead of DETF, resonators 18A and 18B may be single resonator beam or a more complex resonator geometry. Also, resonator beams 19A and 1B may comprise a piezoelectric material and may not include comb tines.

In the example of MEMS VBA 10, resonators 18A-18B are configured to flex in a direction substantially parallel to a long axis of the resonator connection structure 16. The long axis of resonator connection structure 16 is parallel to the X-axis in the example of FIG. 1. Resonators 18A-18B are oriented along the X-axis in the example of MEMS VBA 10. In this disclosure, substantially parallel means structures or planes are parallel within manufacturing and measurement tolerances.

Resonator connection structure 16 connects resonators 18A-18B to primary anchor 14 through a sufficiently rigid connection that allows proof mass 12 to exert axial force on the resonator beams. Resonator connection structure 16 is sized to be stiffer than the axial spring constant of the resonators. The geometry of resonator connection structure 16 and resonators 18A-18B, according to the techniques of this disclosure, configure proof mass 12, resonator beams 19A-19B and resonator connection structure 16 to be connected to the support base by the single region at anchor 14. Resonator connection structure 16 may reduce or prevent bias errors that may otherwise result from the thermal expansion mismatch between the glass substrate (support base) and the silicon mechanism (e.g., pendulous proof mass 12). In other words, the design of the silicon and glass masks are such that both the proof mass 12 and resonators 18A-18B are primarily anchored to a single region, e.g., at anchor 14.

An advantage of the geometry of a MEMS VBA of this disclosure may include reducing or preventing thermal expansion mismatch, as well as other forces exerted on the substrate from reaching resonators 18A-18B and significantly straining the resonator beams. The geometry of this disclosure may have an advantage of ultimately providing a more precise measurement of external acceleration when compared to a MEMS VBA with different geometry. In other words, anchor 14 may be configured to allow a first thermal expansion of the support base, and a second thermal expansion of the monolithic material of resonators 18A-18B and resonator connection structure 16, in examples in which the first thermal expansion is different than the second thermal expansion. The geometry of resonator connection structure 16 is configured to substantially prevent other forces applied to the support base from transferring to either the pendulous proof mass 12 or the at least two resonators. Some examples of other forces may include forces applied to MEMS VBA 10 by the circuit board, or other structure, on which MEMS VBA 10 is mounted. The circuit board may be subjected to forces, such as squeezing or twisting that may be transferred to the components on the circuit board, including MEMS VBA 10.

In the example of FIG. 1, MEMS VBA 10 may be fabricated as one of a plurality of MEMS VBAs 10 on a wafer (not shown). The wafer may include proof mass actuator electrodes 30A and 30B. In some examples, proof mass actuator electrodes 30A and 30B may be included with MEMS VBA 10. In some examples, the wafer and/or MEMS VBA 10 may include one proof mass actuator electrode, e.g., one or either proof mass actuator 30A or 30B. In some examples, the wafer and/or MEMS VBA 10 may include more than two proof mass actuator electrodes, e.g., three or more proof mass actuator electrodes. Proof mass actuator electrodes 30A and 30B may be silicon electrodes connected to bond pads, such as those described above, which may be connected to external circuitry that excites mechanical motion at one or more predetermined frequencies of proof mass 12 through electrostatic actuation, e.g., by applying an electric charge, a current signal, and/or a voltage signal to proof mass actuator electrodes 30A and 30B. In the example shown, there is a small air gap between each proof mass actuator electrode 30A and 30B and proof mass 12. Proof mass actuator electrodes 30A and 30B may be configured as parallel-plate electrodes causing a displacement (dx) of proof mass 12 in response to a capacitance change ($\Delta C$) of proof mass actuator electrodes 30A and 30B. In some examples, proof mass actuator electrodes 30A and 30B may be configured to displace proof mass 12 by a predetermined distance.

In some examples, one or the other of proof mass actuator electrodes 30A and 30B may be configured to drive proof mass 12, and the other of proof mass actuator electrodes 30A and 30B may be configured to sense the motion of proof mass 12 and may be connected to read-out a signal circuitry. In some examples, one proof mass actuator electrode, either 30A or 30B, may be configured to drive proof mass 12 and sense the motion of proof mass 12, and may be connected to read-out circuitry. In some examples, both proof mass actuator electrodes 30A and 30B may be configured to drive proof mass 12 and one or both of resonators 18A and 18B may be configured to sense the motion of proof mass 12 and may be connected to read-out circuitry.

In some examples, resonator electrodes (not shown) may be configured to drive resonators 18A and 18B in closed loop oscillation. A direct current (DC) or slowly varying voltage signal may be applied to each proof mass actuator electrode 30A and 30B to create electrostatic force, and the frequency change of resonators 18A and 18B may be observed to assess scale factor in Hz/g. Driving resonators 18A and 18B in closed loop oscillation and observing the frequency change of resonators 18A and 18B may enable verification that proof mass 12 is correctly connected to resonators 18A and 18B to cause the expected frequency shifts.

In some examples, one or more proof mass actuator electrodes 30A and 30B may be configured as comb fingers having a linear capacitance versus displacement relationship. In some examples, proof mass actuator electrodes 30A and 30B may be embedded within proof mass 12. Although two proof mass actuator electrodes are shown, more or fewer proof mass actuator electrodes may be included and/or used. In some examples, after interim testing using proof mass actuator electrodes 30A and 30B has been completed, e.g., during wafer-level probe testing and package testing, a circuit board (not shown) controlling resonators 18A and 18B may connect proof mass actuator electrodes 30A and 30B to ground, e.g., such that only inertial forces are acting upon proof mass 12 when in use.

Figure 2:
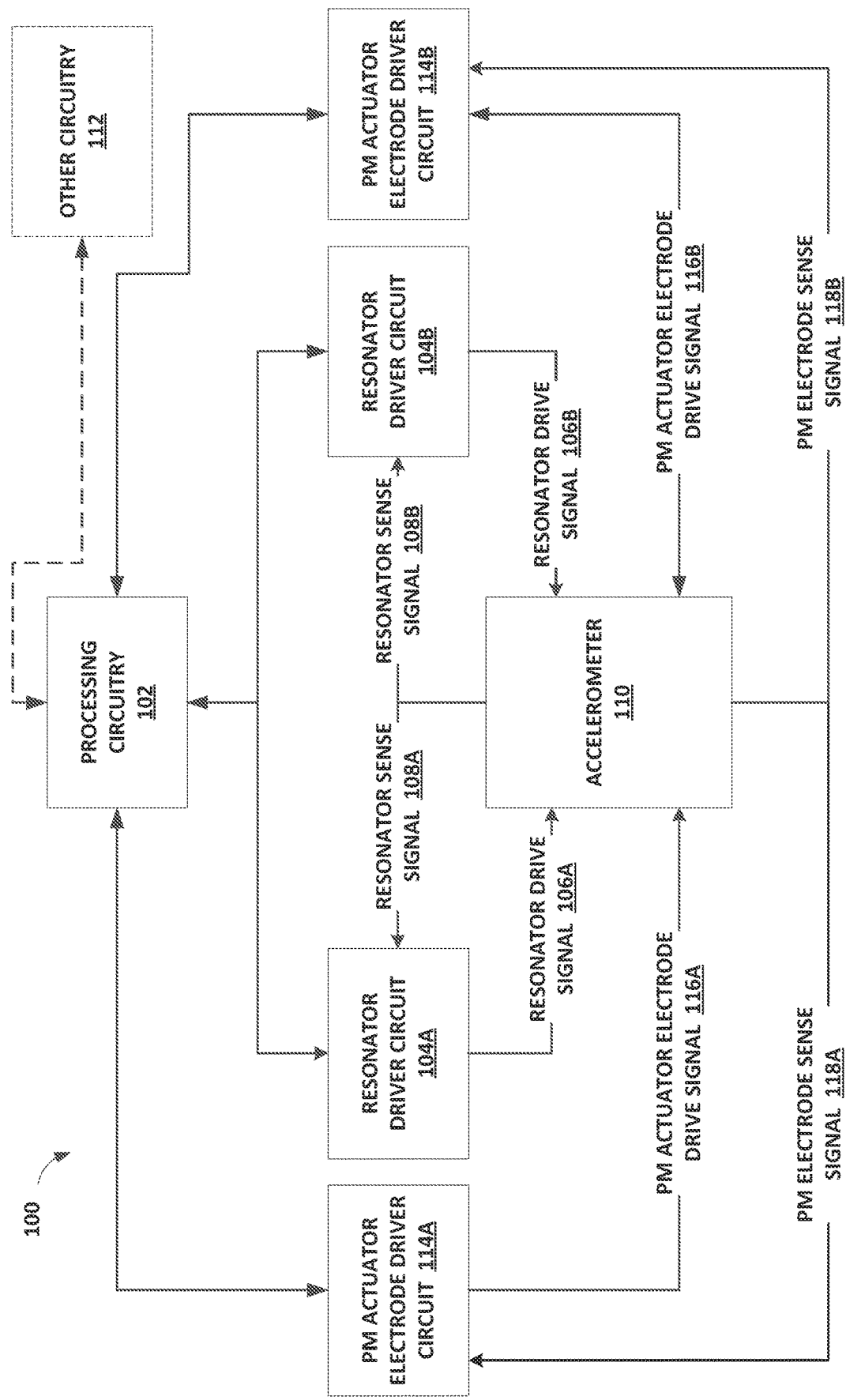
FIG. 2 is a functional block diagram illustrating a system including a MEMS VBA, according to one or more techniques of this disclosure.

FIG. 2 is a functional block diagram illustrating a system 100 including a MEMS VBA 110, according to one or more techniques of this disclosure. The functional blocks of system 100 are just one example of a system that may include a MEMS VBA according to this disclosure. In other examples, functional blocks may be combined, or functions may be grouped in a different manner than depicted in FIG. 2. In some examples, any or all of the functional blocks illustrated and described with respect to FIG. 2 may be included with MEMS VBA 110, e.g., any or all of the functional blocks may be a part of MEMS VBA 110. Other circuitry 112 may include power supply circuits and other processing circuits that may use the output of MEMS VBA 110 to perform various functions, e.g. inertial navigation and motion sensing.

System 100 may include processing circuitry 102, resonator driver circuits 104A and 104B, proof mass actuator electrode driver circuits 114A and 114B, and MEMS VBA 110. MEMS VBA 110 may include any VBA, including the pendulous proof mass MEMS VBAs described above in relation to FIG. 1.

In the example of FIG. 2, resonator driver circuits 104A and 104B are operatively connected to MEMS VBA 110 and may send resonator drive signals 106A and 106B to MEMS VBA 110 as well as receive resonator sense signals 108A and 108B from MEMS VBA 110. In the example of FIG. 2, resonator driver circuit 104A may be coupled to one resonator, e.g., resonator 18A depicted in FIG. 1, and resonator driver circuit 104B may be coupled to a second resonator, e.g. resonator 18B. Resonator driver circuits 104A and 104B may be configured to output a signal that causes the resonators of MEMS VBA 110 to vibrate at a respective resonant frequency of each of the resonators. In some examples, vibrate means to excite and sustain mechanical motion for each resonator through electrostatic actuation. In some examples, resonator driver circuits 104A and 104B may include one or more oscillator circuits. In some examples the signal to MEMS VBA 110 may travel along conductive pathways along or within a support base of accelerometer. The signal from resonator driver circuits 104A and 104B may provide a patterned electric field to cause resonators of MEMS VBA 110 to maintain resonance.

Resonator driver circuit 104A may output drive signal 106A at a different frequency than drive signal 106B from resonator driver circuit 104B. The example of FIG. 2 may be configured to determine a differential frequency signal based on resonator sense signals 108A and 108B. Resonator driver circuits 104A and 104B may adjust the output of resonator drive signals 106A and 106B based on the feedback loop from resonator sense signals 108A and 108B, e.g., to maintain the resonators at the respective resonant frequency. As described above, a MEMS VBA according to this disclosure may include one resonator or more than two resonators and may also include fewer or additional resonator driver circuits.

As described above in relation to FIGS. 1, an acceleration of the pendulous mass MEMS VBA, e.g., in a direction substantially parallel to the plane of the proof mass, may cause a rotation of the pendulous proof mass about the hinge flexure parallel to the plane of the proof mass. The resonators of MEMS VBA 110 may be configured to receive a force, in response to the rotation of the proof mass, such that the force causes a respective change in resonant frequency of at least one resonator.

Processing circuitry 102 may communicate with resonator driver circuits 104A and 104B. Processing circuitry 102 may include various signal processing functions, such as filtering, amplification and analog-to-digital conversion (ADC). Filtering functions may include high-pass, band-pass, or other types of signal filtering. In some examples, resonator driver circuits 104A and 104B may also include signal processing functions, such as amplification and filtering. Processing circuitry 102 may output the processed signal received from MEMS VBA 110 to other circuitry 112 as an analog or digital signal. Processing circuitry 102 may also receive signals from other circuitry 112, such as command signals, calibration signals and similar signals.

Processing circuitry 102 may operatively connect to MEMS VBA 110, e.g., via resonator driver circuits 104A and 104B. Processing circuitry 102 may be configured to receive the signal from MEMS VBA 110, which may indicate of a respective change in the resonant frequency of at least one resonator of MEMS VBA 110. Based on the respective change in resonant frequency, processing circuitry 102 may determine an acceleration measurement, or otherwise determine a motion and/or displacement of proof mass 12. In other examples (not shown in FIG. 2), processing circuitry 102 may be part of the feedback loop from MEMS VBA 110 and may control the resonator drive signals 106A and 106B to maintain the resonators at their resonant frequency.

In the example of FIG. 2, electrode driver circuits 114A and 114B are operatively connected to MEMS VBA 110 and may send proof mass actuator electrode drive signals 116A and 116B to MEMS VBA 110 as well as receive proof mass actuator electrode sense signals 118A and 118B from MEMS VBA 110. In the example of FIG. 2, proof mass actuator electrode driver circuit 114A may be coupled to one electrode, e.g., proof mass actuator electrode 30A depicted in FIG. 1, and proof mass actuator electrode driver circuit 114B may be coupled to a second electrode, e.g., proof mass actuator electrode 30B. Alternatively, MEMS VBA 110 may be fabricated as part of a wafer including a plurality of accelerometers, and proof mass actuator electrode driver circuits 114A and 114B may be operatively connected to components of the wafer to which MEMS VBA 110 may be attached, such as proof mass electrodes 30A and 30B which may be included with the wafer rather than MEMS VBA 110. Proof mass actuator electrode driver circuits 114A and 114B may be configured to output a signal that causes one or more proof mass actuator electrodes to apply a force to a proof mass causing the proof mass to accelerate, displace, vibrate, and/or otherwise move. In some examples, vibrate means to excite and sustain mechanical motion of the proof mass through electrostatic actuation. In some examples, proof mass actuator electrode driver circuits 114A and 114B may include one or more oscillator circuits. In some examples, the signal from proof mass actuator electrode driver circuits 114A and 114B may provide a patterned electric field to cause proof mass 12 of MEMS VBA 110 to maintain a resonance.

In some examples, proof mass actuator electrode drive circuits 114A and 114B may be configured to adjust the output of proof mass actuator electrode drive signals 116A and 116B based on the feedback loop from proof mass actuator electrode sense signals 118A and 118B, e.g., to maintain proof mass 12 at a resonant frequency. A MEMS VBA and/or a wafer including a plurality of MEMS VBAs according to this disclosure may include one proof mass actuator electrode or more than two proof mass actuator electrodes and may also include fewer or additional proof mass actuator electrode driver circuits.

As described above in relation to FIGS. 1, one or more proof mass actuator electrodes may cause a proof mass of a MEMS VBA to accelerate, displace, vibrate, and/or otherwise move in a direction in a direction substantially parallel to the plane of the proof mass and may cause a rotation of the pendulous proof mass about the hinge flexure parallel to the plane of the proof mass. One or more proof mass actuator electrodes may be configured to sense an acceleration, displacement, vibration, and/or motion of the proof mass. Additionally or alternatively, one or more resonators coupled to a proof mass may be configured to sense an acceleration, displacement, vibration, and/or motion of the proof mass as described above, e.g., the proof mass being driven by one or more proof mass actuator electrodes rather than by an inertial or other force.

For example, a proof mass actuator electrode, e.g., proof mass actuator electrode 30A may be configured to drive the proof mass and one or more other proof mass actuator electrode, e.g., proof mass actuator electrode 30B may be configured to sense the motion of the proof mass. In some examples, proof mass actuator electrode driver circuit 114A may output an oscillating drive signal, such as a sinusoidal voltage drive signal including one or more frequencies. Proof mass actuator electrode driver circuits 114A may be configured to output a sinusoidally oscillating proof mass actuator electrode drive signal 116A that causes proof mass actuator electrode 30A to apply a sinusoidally oscillating force to proof mass 12. The sinusoidally oscillating force may cause proof mass 12 to oscillate and/or vibrate, and proof mass actuator electrode 30B may sense the oscillation and/or vibration of proof mass 12, e.g., via an induced current in proof mass actuator electrode 30B proportional to the movement of proof mass 12 in an electric field.

Proof mass electrode driver circuit 114A may be configured to output a proof mass actuator electrode drive signal 116A that oscillates at a plurality of frequencies. In some examples, the plurality of frequencies may be applied at the same time, e.g., proof mass actuator electrode drive signal 118A applied to the electrodes may include a plurality of frequency components. In other examples, the plurality of frequencies may be applied over a period of time, e.g., a frequency sweep drive signal. The resulting electrostatic force on proof mass 12 may include the plurality of frequencies corresponding to the proof mass actuator electrode drive signal, and proof mass 12 may move and/or vibrate in response to the applied oscillating electrostatic force including the plurality of frequencies. In some examples, proof mass 12 may move and/or vibrate in resonance with one or more of the plurality of frequencies, e.g., proof mass 12 may vibrate with an increased vibration amplitude at the one or more resonant frequencies, for example, one or more proof mass natural frequencies.

In some examples, proof mass actuator electrode 30B may output a proof mass actuator electrode sense signal 118B proportional to the sensed motion of proof mass 12. One or both of proof mass actuator electrode driver circuit 114B and processing circuitry 102 may be configured to receive proof mass actuator electrode sense signal 118B and determine the motion of proof mass 12. In some examples, proof mass actuator electrode driver circuit 114B may be configured to drive proof mass 12 and proof mass actuator electrode 30A may be configured to sense the motion of proof mass 12.

In some examples, any or all of proof mass actuator electrode driver circuits 114A and 114B and processing circuitry 102 may be configured to determine a quality factor (Q) associated with the sensed proof mass natural frequency.

In some examples, resonator driver circuits 104a and 104B and/or processing circuitry 102 may be configured to determine an acceleration, a displacement, and/or a motion of proof mass 12 caused by one or both of proof mass actuator electrodes 30A and 30B based on one or both of resonator sense signals 108A and 108B.

For example, one or both of proof mass actuator electrode driver circuits 114A and 114B may be configured to output a slowly varying and/or DC signal causing one or both of proof mass actuator electrodes 30A and 30B to create an electrostatic force on proof mass 12. Proof mass 12 may displace in response to the applied electrostatic force, and a differential frequency measurement may be determined, e.g., by any of resonator driver circuits 104A and 104B and processing circuitry 102 based on resonator sense signals 108A and 108B. Additionally or alternatively, a frequency change of one or both of resonators 18A and 18B may be observed to determine a scale factor in Hz/g. For example, any of resonator driver circuits 104A and 104B and processing circuitry 102 may determine a frequency change in one or both of resonators 18A and 18B and based on resonator sense signals 108A and 108B and any of resonator driver circuits 104A and 104B and processing circuitry 102 may determine a scale factor based on the determined frequency change.

Processing circuitry 102 may communicate with proof mass actuator electrode driver circuits 114A and 114B. Processing circuitry 102 may include various signal processing functions, such as filtering, amplification and analog-to-digital conversion (ADC). Filtering functions may include high-pass, band-pass, or other types of signal filtering. In some examples, proof mass actuator electrode driver circuits 114A and 114B may also include signal processing functions, such as amplification and filtering. Processing circuitry 102 may output the processed signal received from MEMS VBA 110 and/or proof mass actuator electrodes 30A and 30B to other circuitry 112 as an analog or digital signal. Processing circuitry 102 may also receive signals from other circuitry 112, such as command signals, calibration signals and similar signals.

Processing circuitry 102 may operatively connect to MEMS VBA 110 and/or a wafer including a plurality of MEMS VBAs 110, e.g., via proof mass actuator electrode driver circuits 114A and 114B. Processing circuitry 102 may be configured to receive the signal from MEMS VBA 110 and/or a wafer including a plurality of MEMS VBAs 110, which may indicate an acceleration, a motion, a natural frequency, and/or a Q of at least one proof mass of at least one MEMS VBA 110, and may indicate whether at least one proof mass of at least one MEMS VBA is functioning correctly and/or is correctly connected to resonators to cause expected frequency shifts due to acceleration.

In some examples, any or all of electrode driver circuits 114A and 114B, resonator driver circuits 104A and 104B, and processing circuitry 102 may be configured to determine whether the proof mass 12 is stuck or functioning correctly, and whether the proof mass 12 is correctly connected to the resonators, e.g., resonators 18A and 18B, based on any or all of proof mass actuator electrode sense signals 118A and 118B and resonator sense signals 108A and 108B. In some examples, any or all of electrode driver circuits 114A and 114B, resonator driver circuits 104A and 104B, and processing circuitry 102 may be configured to determine proof mass characteristics, e.g., one or more proof mass resonant and/or natural frequencies via applying a frequency sweep drive signal to proof mass actuator electrodes 30A and/or 30B.

In some examples, any or all of electrode driver circuits 114A and 114B, resonator driver circuits 104A and 104B, and processing circuitry 102 may be configured to calibrate MEMS VBA 110 at power-on or at any time during operation. For example, electrode driver circuits 114A and/or 114B may output a signal that causes proof mass actuator electrodes 30A and/or 30B, respectively, to apply a force to proof mass 12 causing proof mass 12 to move. Proof mass actuator electrodes 30A and/or 30B and resonators 18A and/or 18B to sense the movement of proof mass 12 and output proof mass actuator electrode sense signals 118A and/or 118B and/or resonator sense signals 108A and/or 108B, respectively. Electrode driver circuits 114A and/or 114B, or resonator driver circuits 104A and/or 104B, or processing circuitry 102, as appropriate, may then determine a bias and/or scale factor of resonators 18A and/or 18B, and/or one or more calibration parameters of MEMS VBA 110. In other examples, any or all of electrode driver circuits 114A and 114B, resonator driver circuits 104A and 104B, and processing circuitry 102 may be configured to calibrate MEMS VBA 110 via a frequency sweep drive signal applied to proof mass actuator electrodes 30A and/or 30B. In some examples, any or all of electrode driver circuits 114A and 114B, resonator driver circuits 104A and 104B, and processing circuitry 102 may be configured to calibrate MEMS VBA 110 periodically and/or or continuously.

In some examples, any or all of electrode driver circuits 114A and 114B, resonator driver circuits 104A and 104B, and processing circuitry 102 may be configured to force rebalancing or a force-to-rebalance mode of operation. For example, electrode driver circuits 114A and/or 114B may be configured to apply a DC or slowly varying bias voltage signal to proof mass actuator electrodes 30A and/or 30B that causes to proof mass actuator electrodes 30A and/or 30B to apply a force to proof mass 12 to move proof mass 12 back to a default position and/or "hold" proof mass 12 to a default position, e.g., by applying a force via proof mass actuator electrodes 30A and/or 30B that resists motion of proof mass 12 from the default position and thereby causing a greater force (for example, due to acceleration of MEMS VBA 110) to be needed to displace and/or move proof mass 12 from the default position. In some examples, system 100 may be operated in a closed-loop and/or a feedback loop mode. For example, a force may cause proof mass 12 to accelerate, displace, vibrate, or otherwise move, and resonators 18A and/or 18B and/or proof mass electrodes 30A and/or 30B may sense the motion of proof mass 12. Any of electrode driver circuits 114A and/or 114B, or resonator driver circuits 104A and/or 104B, or processing circuitry 102 may determine a signal to apply to proof mass actuator electrodes 30A and/or 30B to drive proof mass 12 back to a default position, e.g., a zero-g or zero external force position, and may cause electrode driver circuits 114A and/or 114B to apply that signal to proof mass actuator electrodes 30A and 30B. In some examples, resonator driver circuits 104A and/or 104B, or processing circuitry 102 may determine a signal to apply to proof mass actuator electrodes 30A and/or 30B to drive proof mass 12 back to a default position based on a difference frequency of resonators 18A and 18B, a weighted and/or scaled difference frequency of resonators 18A and 18B, a squared weighted and scaled difference frequency of resonators 18A and 18B, and the like. In some examples, force rebalancing or force-to-rebalance may improve the operation of system 100 and/or MEMS VBA 110, e.g., system 100 may have an increased sensitivity and/or an extended dynamic range to sense larger forces that may otherwise cause proof mass 12 to reach a displacement limit and/or resonators 18A and/or 18B and/or proof mass actuator electrodes 30A and/or 30B to reach a sensing limit.

Figure 3:
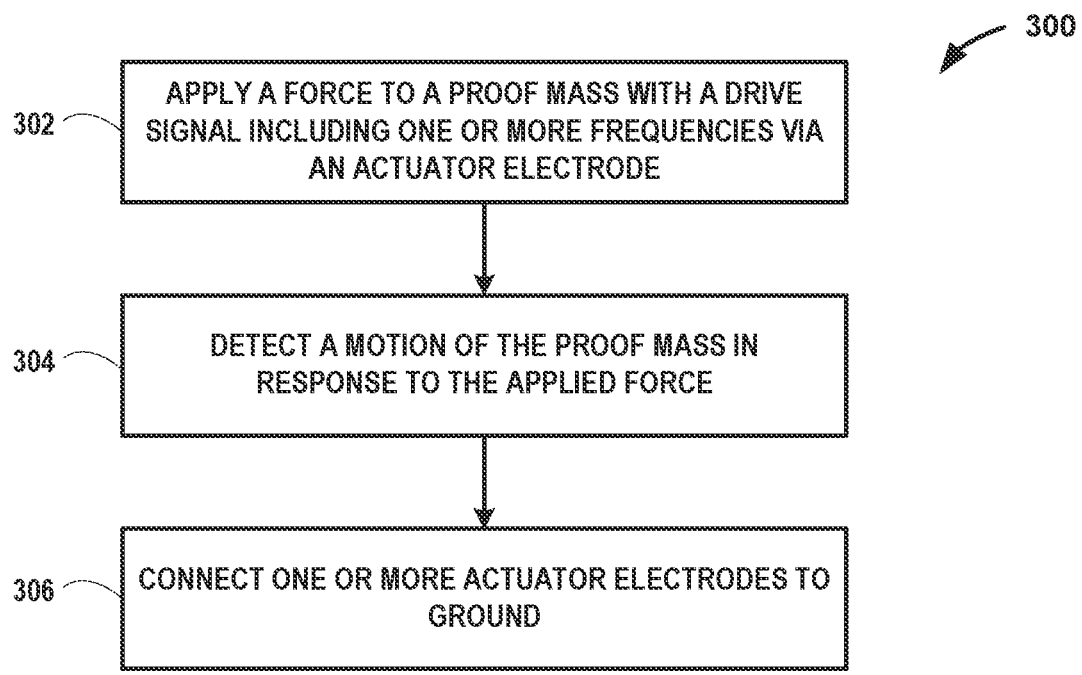
FIG. 3 is a flow diagram illustrating an example method of testing a MEMS VBA, according to one or more techniques of this disclosure.

FIG. 3 is a flow diagram illustrating an example method 300 of testing a MEMS VBA, according to one or more techniques of this disclosure. While method 300 is described with reference to MEMS VBA 110 and/or a wafer including a plurality of MEMS VBAs 110 and electrodes 30A and 30B, the method 300 may be used with other sensors.

A proof mass actuator electrode may apply a force to a proof mass with a drive signal including one or more frequencies (302). In some examples, a proof mass of a MEMS VBA may be driven by a proof mass actuator electrode included with the MEMS VBA or included with a wafer including the MEMS VBA. For example, proof mass actuator electrode driver circuit 114A may output a proof mass actuator electrode drive signal 116A, such as a sinusoidal drive signal including one or more frequencies that causes proof mass actuator electrode 30A to apply a sinusoidally oscillating force to proof mass 12. In some examples, proof mass actuator electrode 30A may apply a force including the plurality of frequencies to proof mass 12 at the same time, e.g., proof mass actuator electrode drive signal 118A may include a plurality of frequency components. In other examples, proof mass actuator electrode 30A may apply a force including the plurality of frequencies to proof mass 12 over a period of time, e.g., a frequency sweep drive signal. The resulting electrostatic force on proof mass 12 may include the plurality of frequencies corresponding to the proof mass actuator electrode drive signal, and proof mass 12 may move and/or vibrate in response to the applied oscillating electrostatic force including the plurality of frequencies. In some examples, proof mass 12 may move and/or vibrate in resonance with one or more of the plurality of frequencies, e.g., proof mass 12 may vibrate with an increased vibration amplitude at the one or more resonant frequencies and/or one or more proof mass natural frequencies.

A proof mass actuator electrode may sense and/or detect a motion of the proof mass in response to the driving force (304). For example, proof mass actuator electrode 30B may sense the oscillation and/or vibration of proof mass 12. In some examples, proof mass actuator electrode 30B may output a proof mass actuator electrode sense signal 118B proportional to the sensed motion of proof mass 12. One or both of proof mass actuator electrode driver circuit 114B and processing circuitry 102 may be configured to receive proof mass actuator electrode sense signal 118B and determine the motion of proof mass 12. In some examples, proof mass actuator electrode driver circuit 114B may be configured to drive proof mass 12 and proof mass actuator electrode 30A may be configured to sense the motion of proof mass 12.

In some examples, any or all of proof mass actuator electrode driver circuits 114A and 114B and processing circuitry 102 may be configured to determine a quality factor (Q) associated with the sensed proof mass natural frequency.

One or more proof mass actuator electrodes may be connected to ground (306). For example, proof mass actuator electrodes may be intended for use only during interim testing such as wafer-level probe testing and package testing. A circuit board (not shown), e.g., including any or all of electrode drive circuitry 114A and 114B, resonator drive circuitry 104A and 104B, processing circuitry 102, and other processing circuitry 112, may connect proof mass actuator electrodes 30A and 30B to ground subsequent to testing such that only inertial forces act upon the proof mass. In other words, electrodes 30A and 30B may be grounded and prevented from acting on or applying a force to proof mass 12 when MEMS VBA 110 is in use after testing.

Figure 4:
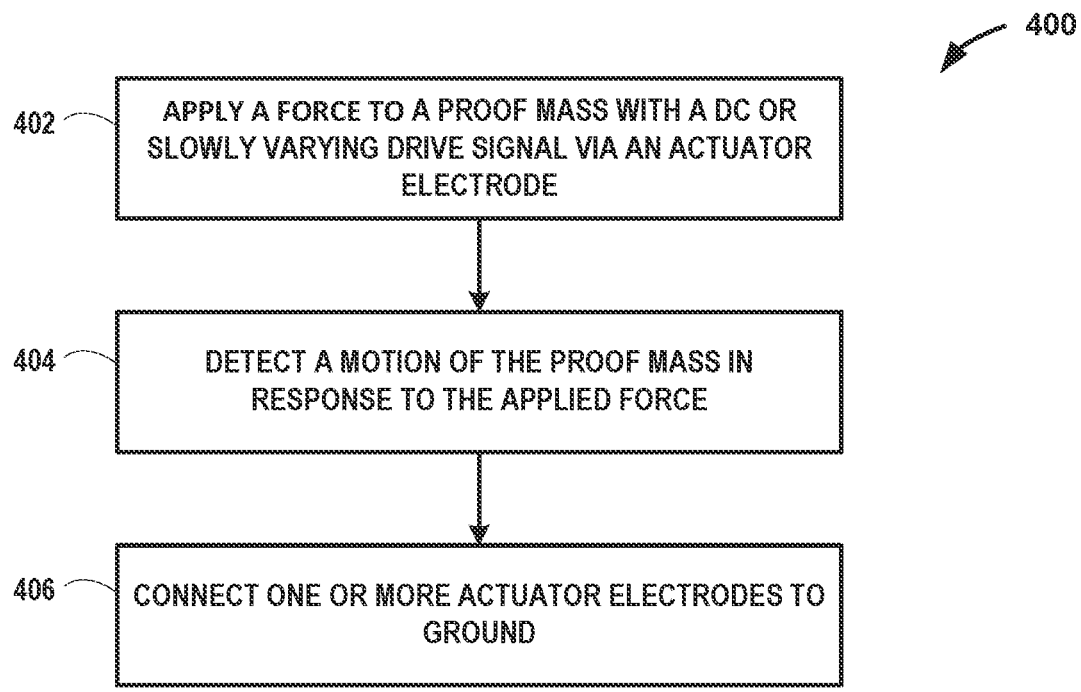
FIG. 4 is a flow diagram illustrating another example method of testing a MEMS VBA, according to one or more techniques of this disclosure.

FIG. 4 is a flow diagram illustrating another example method 400 of testing a MEMS VBA, according to one or more techniques of this disclosure. While method 400 is described with reference to MEMS VBA 110 and/or a wafer including a plurality of MEMS VBAs 110 and electrodes 30A and 30B, the method 400 may be used with other sensors.

A proof mass actuator electrode may apply a force to a proof mass with a DC, or slowly varying, drive signal (402). In some examples, a proof mass of a MEMS VBA may be driven by a proof mass actuator electrode included with the MEMS VBA or included with a wafer including the MEMS VBA. For example, proof mass actuator electrode driver circuits 114A and 114B may output a proof mass actuator electrode drive signals 116A and 116B, slowly varying and/or DC voltage signal causing one or both of proof mass actuator electrodes 30A and 30B to create an electrostatic force on proof mass 12. Proof mass 12 may accelerate, displace, or otherwise move in response to the applied electrostatic force. In some examples, one or both of proof mass actuator electrodes 30A and 30B may displace proof mass 12 by a predetermined distance via creating an electrostatic force on proof mass 12.

A resonator may sense and/or detect an acceleration, displacement, and/or a motion of the proof mass in response to the driving force (404). For example, any of resonator driver circuits 104A and 104B and processing circuitry 102 may determine a differential frequency based on resonator sense signals 108A and 108B. Additionally or alternatively, any of resonator driver circuits 104A and 104B and processing circuitry 102 may determine a frequency change of one or both of resonators 18A and 18B and determine a scale factor in Hz/g based on the frequency change.

One or more proof mass actuator electrodes may be connected to ground (406), e.g., similar to (306) described above. For example, proof mass actuator electrodes may be intended for use only during interim testing such as wafer-level probe testing and package testing. A circuit board (not shown), e.g., including any or all of electrode drive circuitry 114A and 114B, resonator drive circuitry 104A and 104B, processing circuitry 102, and other processing circuitry 112, may connect proof mass actuator electrodes 30A and 30B to ground subsequent to testing such that only inertial forces act upon the proof mass. In other words, electrodes 30A and 30B may be grounded and prevented from acting on or applying a force to proof mass 12 when MEMS VBA 110 is in use after testing.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A system comprising:
   a microelectromechanical system (MEMS) vibrating beam accelerometer (VBA) comprising:
      a proof mass; and
      a first resonator mechanically coupled to the proof mass;
   a first proof mass actuator electrode separate from the first resonator and positioned adjacent to a first side of the proof mass; and
   a second proof mass actuator electrode separate from the first resonator and positioned adjacent to a second side of the proof mass, wherein the first side of the proof mass is opposite the second side of the proof mass, wherein the first proof mass actuator electrode and the second proof mass actuator electrode comprise opposing parallel plates configured to apply a force to the proof mass in a direction of motion of the proof mass, wherein the proof mass is located between the first and second proof mass actuator electrodes,
   wherein the first and second proof mass actuator electrodes are configured to be connected to ground, wherein the first and second proof mass actuator electrodes are configured to be prevented from applying a force to the proof mass when connected to ground.

2. The system of claim 1, wherein the MEMS VBA further comprises:
   a second resonator mechanically coupled to the proof mass, wherein the first resonator and the second resonator are arranged with opposing scale factors;
   wherein the second proof mass actuator electrode is configured to sense a motion of the proof mass and output a signal corresponding to the sensed motion of the proof mass,
   wherein the force is an electrostatic force.

3. The system of claim 2, wherein the first and second proof mass actuator electrodes are configured to apply the electrostatic force displacing the proof mass by a predetermined distance,
   wherein the first and second resonators are configured to be driven in closed-loop oscillation,
   wherein the first and second resonators are configured to shift resonance frequency based on a proof mass displacement.

4. The system of claim 3, wherein the first and second proof mass actuator electrodes are embedded within the proof mass.

5. The system of claim 4, wherein the first and second proof mass actuator electrodes are separated from the proof mass by an air gap and are positioned on opposite sides of the proof mass in the direction of proof mass motion.

6. The system of claim 1, wherein the MEMS VBA is included in a MEMS VBA wafer comprising a plurality of MEMS VBAs.

7. The system of claim 6, wherein the MEMS VBA wafer comprises the first proof mass actuator electrode and the second proof mass actuator electrode configured to sense a motion of the proof mass and output a signal corresponding to the sensed motion of the proof mass.

8. The system of claim 6, wherein the MEMS VBA comprises the first proof mass actuator electrode and the second proof mass actuator electrode configured to sense a motion of the proof mass and output a signal corresponding to the sensed motion of the proof mass.

9. A method of testing of a microelectromechanical system (MEMS) vibrating beam accelerometer (VBA), the method comprising:
   applying a force to a proof mass of a MEMS VBA in a direction of motion of the proof mass, wherein the proof mass is located between a first proof mass actuator electrode and a second proof mass actuator electrode, wherein the first proof mass actuator electrode is positioned adjacent to a first side of the proof mass and the second proof mass actuator electrode is positioned adjacent to a second side of the proof mass, wherein the first side of the proof mass is opposite the second side of the proof mass, wherein the first proof mass actuator electrode and the second proof mass actuator electrode comprise opposing parallel plates, wherein the first proof mass actuator electrode and the second proof mass actuator electrode are separate from a first resonator;
   detecting, by either of the second proof mass actuator electrode or the first resonator, a motion of the proof mass due to the applied force, wherein the first resonator is mechanically coupled to the proof mass; and
   connecting, subsequent to the detecting a motion of the proof mass due to the applied force, the first and second proof mass actuator electrodes to ground, wherein the first and second proof mass actuator electrodes are configured to be prevented from applying a force to the proof mass when connected to ground.

10. The method of claim 9, wherein the first proof mass actuator electrode and the second proof mass actuator electrode are configured to apply the force to the proof mass at a plurality of driving frequencies, and wherein the second proof mass actuator electrode is configured to detect a resonant motion of the proof mass due to the applied force.

11. The method of claim 10, further comprising:
   determining, via a processor, a quality factor (Q) associated with a proof mass natural frequency based on the resonant motion of the proof mass due to the applied force.

12. The method of claim 9, wherein the force is an electrostatic force, wherein the first proof mass actuator electrode and the second proof mass actuator electrode are configured to displace the proof mass by an amount in proportion to an amount of the applied electrostatic force, the method further comprising:
   driving the first resonator and a second resonator in closed-loop oscillation; and
   determining a resonance frequency shift in at least one of the first resonator and the second resonator proportional to a proof mass displacement.

13. The method of claim 9, wherein the MEMS VBA is included in a MEMS VBA wafer.

14. A system comprising:
   a microelectromechanical system (MEMS) vibrating beam accelerometer (VBA) comprising:
      a proof mass;
      a first resonator mechanically coupled to the proof mass;
      a second resonator mechanically coupled to the proof mass, wherein the first resonator and the second resonator are arranged with opposing scale factors;
   a first proof mass actuator electrode separate from the first resonator and second resonator and positioned adjacent to a first side of the proof mass and having an air gap between the first proof mass actuator electrode and the proof mass;
   a second proof mass actuator electrode separate from the first resonator and second resonator and positioned adjacent to a second side of the proof mass and having an air gap between the second proof mass actuator electrode and the proof mass, wherein the first side of the proof mass is opposite the second side of the proof mass, wherein the first proof mass actuator electrode and the second proof mass actuator electrode comprise opposing parallel plates configured to apply a force to the proof mass in a direction of motion of the proof mass, wherein the proof mass is located between the first and second proof mass actuator electrodes,
   wherein the second proof mass actuator electrode is configured to sense a motion of the proof mass and output a signal corresponding to the sensed motion of the proof mass, wherein the first and second proof mass actuator electrodes are configured to be connected to ground, wherein the first and second proof mass actuator electrodes are configured to be prevented from applying a force to the proof mass when connected to ground; and
   processing circuitry configured to:
      cause the first proof mass actuator electrode and the second proof mass actuator electrode to apply the force to the proof mass in the direction of motion of the proof mass;
      receive the signal corresponding to the motion of the proof mass in response to the applied force sensed by the second proof mass actuator electrode; and
      determine the motion of the proof mass based on the received signal.

15. The system of claim 14, wherein the processing circuitry is further configured to:
   cause a sinusoidal voltage signal at a plurality of frequencies to be applied to the first proof mass actuator electrode to apply a sinusoidal force at the plurality of frequencies to the proof mass; and
   determine one or more resonant frequencies of the proof mass based on the received signal.

16. The system of claim 15, wherein the processing circuitry is further configured to determine a quality factor (Q) associated with a proof mass natural frequency based on the received signal.

17. The system of claim 14, wherein the processing circuitry is further configured to:

cause a slowly varying and/or DC voltage signal to be applied to the first and second proof mass actuator electrodes to apply an electrostatic force to displace the proof mass;

receive a resonator sense signal corresponding to a frequency shift of the first and second resonators in response to the displacement of the proof mass; and determine that the proof mass is correctly connected to the first and second resonators based on the received resonator sense signal.

18. The system of claim 1, wherein the first and second proof mass actuator electrodes are configured to be prevented from applying a force to the proof mass when connected to ground when the MEMS VBA is in use after testing.

* * * * *